Oct. 24, 1933.  F. C. THOMPSON  1,931,516
INTERNAL BRAKE FOR MOTOR VEHICLE WHEELS
Filed March 14, 1928  2 Sheets-Sheet 2
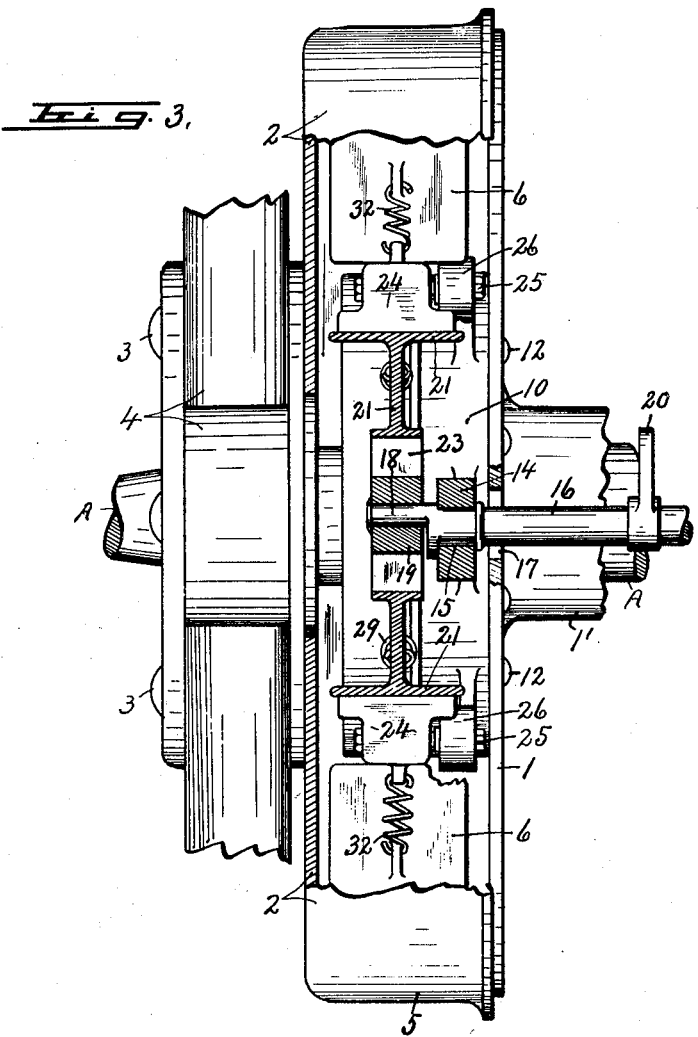
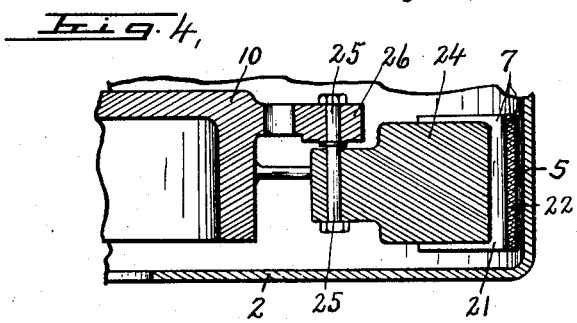
WITNESS
J. T. Mains
INVENTOR
F. C. Thompson
BY
Denison & Thompson
ATTORNEYS Patented Oct. 24, 1933

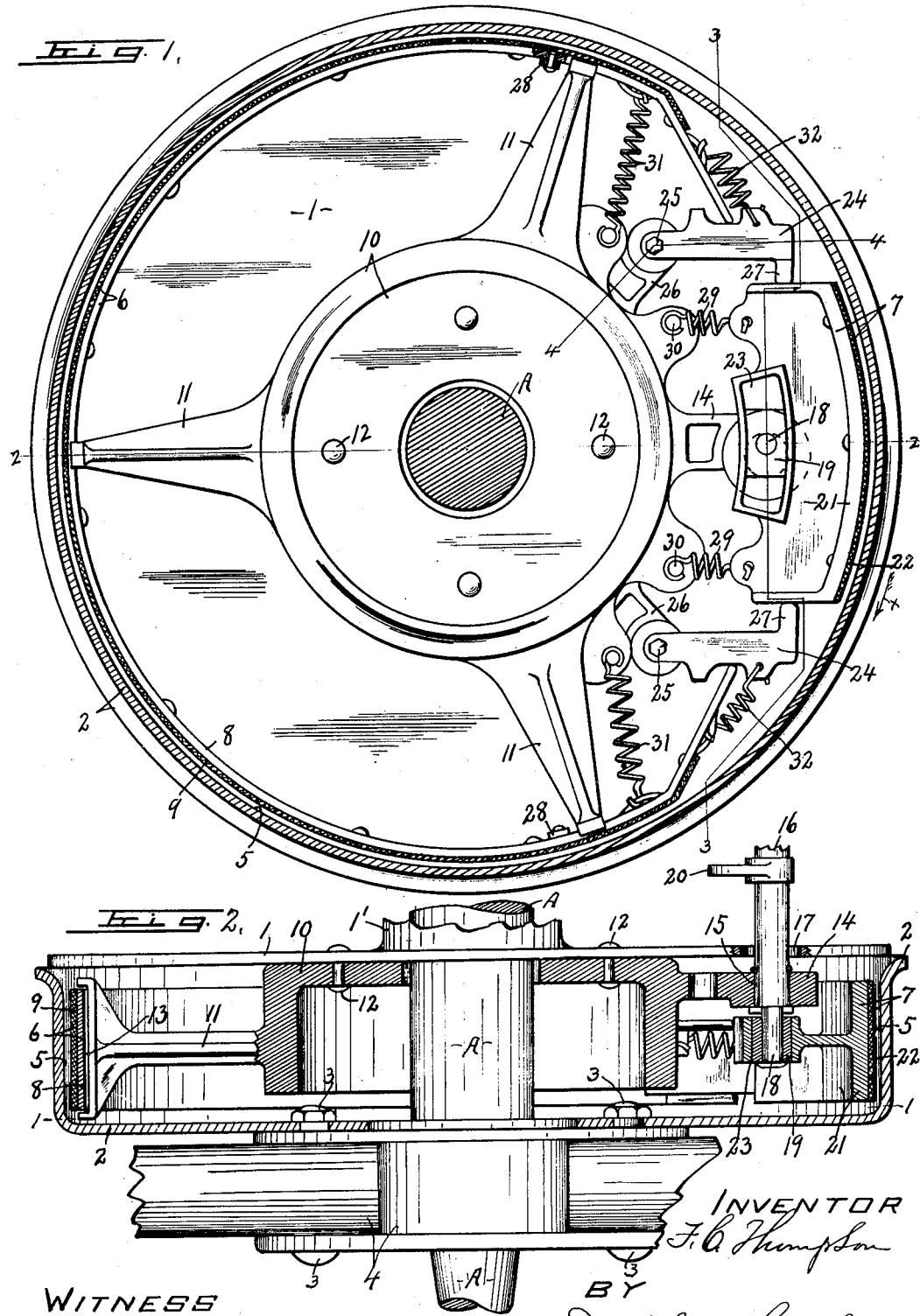

1,931,516

UNITED STATES PATENT OFFICE 1,931,516

INTERNAL BRAKE FOR MOTOR VEHICLE WHEELS

Frank C. Thompson, Syracuse, N. Y.

Application March 14, 1928. Serial No. 261,662

1 Claim. (Cl. 188—78)

This invention relates to a mechanical brake and more particularly to an internal expanding and self-retracting brake adapted to be used in connection with the brake drums of motor vehicle wheels in which the ends of a split brake band are spaced a sufficient distance apart circumferentially to receive an auxiliary friction block or segment adapted to be forced radially into frictional engagement with the brake drum and having a limited circumferential movement by said frictional engagement for expanding the brake band against the inner periphery of the drum as the wheel is rotated forwardly or rearwardly.

The main object of this invention is to enable the auxiliary friction block or segment to be forced to its brake-applying position with a minimum movement and power and to utilize the frictional engagement between it and the rotating brake drum for automatically expanding the brake band into frictional engagement with the drum under a greatly increased force or power over that applied to the segment.

One of the specific objects is to interpose suitable but similar levers between the ends of the segment and adjacent ends of the brake band whereby the slightest circumferential movement of the brake shoe or segment by frictional engagement with the rotating drum in either direction will automatically force the brake band into frictional engagement with the brake drum throughout practically its entire length and under a multiplying leverage so as to obtain a maximum brake pressure of the band against the drum with a minimum brake pressure of the segment against the same drum.

A further object is to provide means for automatically restoring the brake band and segment to their normal or neutral positions out of frictional engagement with the drum when the radial pressure of the segment against the drum is released.

Another object is to provide means for limiting the circumferential movement of the brake band by the corresponding movement of the friction block whereby the frictional engagement of the band with the drum will be gradual from its center toward its ends for utilizing practically the entire length of the band as a braking medium in addition to the frictional resistance produced by the operation of the segment.

Other objects and uses relating to specific parts of the brake and its operating means will be brought out in the following description.

In the drawings:—

Figure 1 is a transverse sectional view of the brake drum taken in the plane of line 1—1, Figure 2, showing an end face view of the brake mechanism and support therefor.

Figure 2 is a horizontal sectional view taken in the plane of line 2—2, Figure 1.

Figure 3 is a longitudinal vertical sectional view taken in the plane of line 3—3, Figure 1.

Figure 4 is a detail sectional view taken in the plane of line 4—4, Figure 1.

In order that the invention may be clearly understood I have shown a portion of the chassis frame of a motor vehicle surrounding one of the rear axle sections as —A— and provided with a stationary circular disk —1— serving as a partial closure for the inner open end of a brake drum —2— which is secured by bolts —3— to the adjacent wheel —4— to rotate with said wheel.

The axle —A— may be journaled in any well-known manner in the tubular portion as —1'— of the chassis frame to rotate therein while the wheel —4— may be mounted in any conventional manner to the outer end of the axle to rotate therewith or to rotate thereon.

The brake drum may also be of conventional form and provided as usual with an inner cylindrical friction surface —5— of any desired axial length between the outer end of the drum and plate —1— to form an intervening space for the reception of the brake members and their supports.

A circular brake band —6— extends circumferentially around and within the brake drum —2— in normally spaced relation thereto and the major portion of the length thereof but is divided through one side to form an intervening space for receiving a brake shoe or supplemental friction block —7— between the ends thereof and preferably in the horizontal plane and some distance in front of the axle —A—.

The peripheries of the brake band —6— and brake shoe —7— extend the greater portion of the length of the brake surface —5— of the drum —2— but in sufficiently spaced relation between the outer end of the drum and plate —1— to avoid endwise friction therewith and also to permit free radial movement of the band and brake shoe.

The band —6— comprises an inner supporting band —8— of relatively thin spring metal and an outer lining —9— of fibrous material commonly used for this purpose and riveted or otherwise secured to the periphery of the inner supporting band —8— to form a substantially unitary part thereof.

The brake band —6— is supported in its neutral position in proximity but in slightly spaced relation to the inner periphery of the drum —2— by means of a spider having a central hub —10— and a series of, in this instance three, radially projecting arms —11— which are preferably integrally united at their inner ends to the periphery of the hub —10—.

The hub —10— is substantially circular and concentric with the axis of the shaft —A— and is rigidly secured to the inner face of the stationary plate —1— by rivets —12— or equivalent fastening means to remain stationary with reference to the drum —2— and axle —A— thereby forming what may be termed a non-rotatable frame.

The outer ends of the arms —11— are elongated axially beyond the corresponding ends of the brake band —6— and are formed with peripheral grooves —13— for receiving said band and holding it against axial displacement, said arms also serving to support the band circumferentially in its normal or neutral position and substantially concentric with and in spaced relation to the periphery of the drum —2—.

The hub —10— is also provided with a central forwardly projecting radial arm —14— disposed in a horizontal plane substantially midway between the ends of the brake band —6— when the latter is in its normal or neutral position, said arm —14— being provided with a central axially extending journal bearing —15— in which is journaled a rock shaft —16—.

This rock shaft extends axially some distance beyond the inner and outer faces of the arm —14— and also through an opening —17— in the adjacent portion of the plate —1—.

The outer end of the rock shaft extends into the interior of the drum —5— some distance inwardly from the inner periphery thereof and is provided with an eccentric pin or stud —18— which is journaled in a block or cross head —19— on the supporting frame for the shoe as shown more clearly in Figure 3.

A crank arm —20— is secured to the rock shaft —16— just at the inner side of the plate —1— and is adapted to be connected to any suitable operating mechanism such, for example, as the usual emergency lever or pedal lever commonly employed in the operation of brake mechanisms of motor vehicles for rocking the shaft —16— in reverse directions and thereby causing a similar radial reciprocatory movement of the cross head or block —19— between the adjacent portions of the peripheries of the stationary hub —10— and brake drum. The shoe comprises a frame —21— having a circular periphery and an outer lining —22— riveted or otherwise secured thereto to form practically a unitary part thereof.

The frame —21— extends circumferentially equal distances beyond the axis of the eccentric pin or stud —18— and normally midway between the ends of the brake band —6— but in spaced relation thereto for a purpose presently described, said frame —21— being also extended inwardly and radially across the axis of the rock shaft —16— and around the eccentric pin or stud —18— and is provided with a circumferentially elongated slot —23— in which the block or cross head —19— is slidable.

That is, the slot —23— extends circumferentially equal distances beyond and at opposite sides of the eccentric pin —18— and is provided with inner and outer circular walls normally concentric with the axis of the shaft —A—, said slots being of greater circumferential length than the cross head to permit a limited circumferential movement of the brake shoe and cross head relatively to each other.

When the crank arm —20— is in its neutral position the eccentric pin —18— will also be in a neutral position for withdrawing the brake shoe —7— inwardly out of engagement with the inner periphery of the brake drum —2— through the medium of the cross head —19—, but obviously if the crank arm —20— is operated from its neutral position the corresponding shifting movement of the eccentric pin —18— will force the brake shoe —7— outwardly into frictional engagement with the brake drum.

This frictional engagement of the brake shoe with the brake drum will cause the brake shoe to be moved circumferentially a limited distance in the direction of rotation of the drum and this circumferential movement of the brake shoe is utilized to force the brake band —6— into frictional engagement with the drum in a manner presently described.

A pair of similar levers —24— are pivotally mounted at their ends at —25— upon suitable lugs —26— on the peripheries of the hub —10— to extend outwardly in normally parallel relation at opposite ends of the brake shoe —7— and are provided with offset portions —27— projecting toward each other and normally engaged with the adjacent end faces of the brake shoe, as shown more clearly in Figure 1.

The outer end of each lever is interposed between the adjacent ends of the brake shoe —7— and brake band —6— and, as illustrated, the ends of the brake band are deflected inwardly away from the periphery of the brake drum and engage the outer edges of their respective levers —24— midway between the ends thereof or rather between their pivots —25— and points of engagement with the adjacent ends of the brake shoe —7—.

It is now clear that if the brake shoe —7— is shifted circumferentially by frictional engagement with the rotating brake drum —2— then this motion will be transmitted through the corresponding lever —24— to the adjacent end of the brake band —6— thereby effecting a corresponding circumferential movement of the brake band.

This circumferential movement of the brake band is, however, limited by suitable stops —28— normally in spaced relation to but adapted to engage the outer ends of the adjacent arms —11—, as shown more clearly in Figure 1, and when so limited the continued circumferential movement of the brake shoe —7— by frictional contact with the rotating drum —2— will cause the brake band to expand against the inner periphery of the drum for adding its frictional resistance to the rotation of the drum.

That is, assuming that the brake drum is rotated forwardly or in the direction indicated by arrow —x—, Figure 1, the operation of the crank shaft —16— from its neutral position will shift the brake shoe —7— radially into engagement with the periphery of the brake drum and this frictional engagement will cause the brake shoe to move in the same direction against the underlying lever —24— which, in turn, will transmit its motion to the adjacent end of the brake band —6— for shifting said brake band radially and circumferentially until limited by the engagement of the upper stop shoulder —28— with the adjacent arm —11— at which time the central portion of the brake band will have been brought into frictional engagement with the brake drum.

During this action the resistance to circumferential movement caused by the engagement of the upper stop —28— with the adjacent arm —11— together with the application of power to the opposite end of the brake shoe through the medium of the lever —24— will cause the brake band to gradually engage the periphery of the brake drum from its center toward the ends with increased power over that applied to the brake shoe due to the multiplied leverage between the brake shoe and end of the brake drum.

It is evident from the foregoing description that if the brake drum is rotated in the opposite direction and the brake shoe —7— is frictionally applied to the periphery of the brake drum it will be rotated upwardly against the upper lever —24— thereby effecting a similar expanding movement of the brake band against the brake surface of the drum, it being understood that in both cases the force applied to the operation of the brake band is considerably greater than that applied to the brake shoe due to the increased leverage from the brake shoe and brake band.

When the crank shaft —16— is released from its brake-applying position and returned to its neutral position the brake shoe —7— and brake band —6— will be returned to their neutral or inactive positions away from the periphery of the brake drum by reason of the positive withdrawal of the brake shoe —7— inwardly through the medium of the crank pin —18— and cross head or block —19—.

This inward retracting movement of the brake shoe is aided by retracting springs —29— connecting opposite ends of the brake shoe with suitable pins —30— on the periphery of the drum —10—, as shown in Figure 2.

In like manner the opposite ends of the brake band —6— will be retracted inwardly by coiled springs —31— connecting them with pins —30'— on the periphery of the drum —10—.

The levers —24— are yieldingly held against the adjacent ends of the brake bands —6— by coiled springs —32— to prevent independent vibration thereof and noise incidental to such vibration.

It is, of course, to be understood that although I have shown a single brake mechanism for one of the rear wheels of a motor vehicle it is intended to apply the same mechanism to both of the rear wheels and that, when desired, the essential features of the invention may be applied to the brake drums for the front wheels and to any other rotary brake drum used in connection with other mechanisms without departing from the spirit of this invention.

What I claim is:

In an internal brake of the character described, the combination with a rotary brake drum and a non-rotatable frame, a rock shaft parallel with the axis of the drum and provided with an eccentric bearing, a cross head journaled on said bearing, a friction block slidable circumferentially upon the cross head, means operable at will for rocking said shaft to force the friction block into engagement with the inner surface of the drum, a pair of levers having their inner ends pivoted to the frame and their outer ends engaging corresponding ends of the friction block and a split brake band having its opposite ends engaging corresponding levers between their pivots and points of engagement with the ends of the friction block.

FRANK C. THOMPSON.